(12) United States Patent
Choi et al.

(10) Patent No.: US 11,522,198 B2
(45) Date of Patent: Dec. 6, 2022

(54) NEGATIVE ELECTRODE FOR LITHIUM-METAL SECONDARY BATTERY AND LITHIUM-METAL SECONDARY BATTERY INCLUDING THE SAME

(71) Applicant: LG CHEM, LTD., Seoul (KR)

(72) Inventors: Hee Won Choi, Daejeon (KR); Sang Wook Woo, Daejeon (KR); Oh Byong Chae, Daejeon (KR); Eun Kyung Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 494 days.

(21) Appl. No.: 16/303,011

(22) PCT Filed: Sep. 29, 2017

(86) PCT No.: PCT/KR2017/010974
§ 371 (c)(1),
(2) Date: Nov. 19, 2018

(87) PCT Pub. No.: WO2018/066931
PCT Pub. Date: Apr. 12, 2018

(65) Prior Publication Data
US 2019/0207224 A1    Jul. 4, 2019

(30) Foreign Application Priority Data

Oct. 5, 2016 (KR) .......... 10-2016-0128581
Sep. 28, 2017 (KR) .......... 10-2017-0125951

(51) Int. Cl.
*H01M 4/66* (2006.01)
*H01M 4/134* (2010.01)
(Continued)

(52) U.S. Cl.
CPC ......... *H01M 4/661* (2013.01); *H01M 4/0471* (2013.01); *H01M 4/0483* (2013.01);
(Continued)

(58) Field of Classification Search
CPC . H01M 10/05–052; H01M 4/02–1395; H01M 4/00–134; H01M 4/04; H01M 2004/027
See application file for complete search history.

(56) References Cited

U.S. PATENT DOCUMENTS 9,673,443 B2   6/2017   Son et al.
9,711,798 B2   7/2017   Son et al.
(Continued)

FOREIGN PATENT DOCUMENTS

CN    101237038 A    8/2008
CN    101476139 A    7/2009
(Continued)

OTHER PUBLICATIONS

EPO machine translation of JP 20130085410 originally published to Okuno, Kazuki on Jan. 10, 2013 (Year: 2013).*
(Continued)

*Primary Examiner* — Jonathan G Jelsma
*Assistant Examiner* — Niara Trant
(74) *Attorney, Agent, or Firm* — Birch, Stewart, Kolasch & Birch, LLP (57) ABSTRACT

A negative electrode for a lithium-metal secondary battery, which has a wide specific surface area and a current density distribution that can be uniformly implemented, and a lithium-metal secondary battery including the same.

10 Claims, 3 Drawing Sheets

100

(51) Int. Cl.

| | | |
|---|---|---|
| *H01M 4/1395* | (2010.01) | |
| *H01M 4/80* | (2006.01) | |
| *H01M 4/38* | (2006.01) | |
| *H01M 4/04* | (2006.01) | |
| *H01M 10/052* | (2010.01) | |
| *H01M 4/02* | (2006.01) | |

(52) U.S. Cl.
CPC ......... *H01M 4/134* (2013.01); *H01M 4/1395* (2013.01); *H01M 4/382* (2013.01); *H01M 4/667* (2013.01); *H01M 4/808* (2013.01); *H01M 10/052* (2013.01); *H01M 2004/021* (2013.01); *H01M 2004/027* (2013.01); *Y02E 60/10* (2013.01); *Y02T 10/70* (2013.01)

(56) References Cited

U.S. PATENT DOCUMENTS

| | | | |
|---|---|---|---|
| 2015/0280212 A1 | 10/2015 | Son et al. | |
| 2015/0295246 A1 | 10/2015 | Son et al. | |
| 2017/0098856 A1* | 4/2017 | Zhamu | H01M 4/525 |
| 2017/0104204 A1* | 4/2017 | Zhamu | H01M 4/0416 |
| 2019/0051905 A1* | 2/2019 | Zhamu | H01M 4/366 |

FOREIGN PATENT DOCUMENTS

| | | |
|---|---|---|
| CN | 102185131 A | 9/2011 |
| CN | 105009330 A | 10/2015 |
| JP | 2003-142088 A | 5/2003 |
| JP | 2013-8540 A | 1/2013 |
| KR | 10-1999-0055229 A | 7/1999 |
| KR | 10-2013-0042487 A | 4/2013 |
| KR | 10-2013-0067920 A | 6/2013 |
| KR | 10-2014-0058928 A | 5/2014 |
| KR | 10-2015-0030156 A | 3/2015 |

OTHER PUBLICATIONS

Korean Application translation of KR 20140058928 originally published to Kim Dong Hui on May 15, 2014 (Year: 2014).*
EPO machine translation of JP 2003142088 originally published to Okuhama Yoshiaki on May 16, 2003 (Year: 2003).*
International Search Report for PCT/KR2017/010974 dated May 23, 2018.
Tokur et al., "Electrolytic coating of Sn nano-rods on nickel foam support for high performance lithium ion battery anodes", Surface & Coatings Technology, Jan. 13, 2016, vol. 288, pp. 62-68.
Extended European Search Report for European Application No. 17858725.9, dated Jul. 8, 2019.

* cited by examiner

NEGATIVE ELECTRODE FOR LITHIUM-METAL SECONDARY BATTERY AND LITHIUM-METAL SECONDARY BATTERY INCLUDING THE SAME

CROSS-REFERENCE TO RELATED APPLICATIONS

This application claims the benefit of Korean Patent Application No. 10-2016-0128581, filed on Oct. 5, 2016, and Korean Patent Application No. 10-2017-0125951, filed on Sep. 28, 2017, in the Korean Intellectual Property Office, the disclosure of which is incorporated herein in its entirety by reference.

TECHNICAL FIELD

Technical Field

The present invention relates to a negative electrode for a lithium-metal secondary battery, which has a wide specific surface area and a current density distribution that can be uniformly implemented, and to a lithium-metal secondary battery including the same.

Background Art

As the technological development and demand for mobile devices have increased, the demand for secondary batteries as an energy source is rapidly increasing, and among such secondary batteries, a lithium secondary battery having high energy density and voltage, and a low self discharge rate has been commercialized.

Lithium-metal secondary batteries are the first commercialized lithium secondary batteries in which a lithium metal is used as a negative electrode. However, the lithium-metal secondary battery had problems of cell expansion and gradual decrease in capacity and energy density due to a lithium resin phase formed on the surface of the lithium-metal negative electrode, short caused by continuous growth of the resin phase, decrease in cycle life, and cell stability (explosion and firing), and therefore, the production thereof was stopped just several years after being commercialized. Accordingly, instead of the lithium metal, a carbon-based negative electrode which is safer and can safely store lithium in a lattice or vacant space in an ion state was used, and due to the use of the carbon-based negative electrode, full-scale commercialization and propagation of lithium secondary batteries have progressed.

So far, the main stream of the lithium secondary batteries have been carbon-based or non-carbon-based negative electrode materials, and most development of negative electrode materials have been concentrated on carbon-based materials (such as graphite, hard carbon, soft carbon) and non-carbon-based materials (such as silicon, tin, titanium oxides). However, the carbon-based materials have theoretical capacity of 400 mAh/g or less, and the non-carbon-based materials have the theoretical capacity of greater than 1000 mAh/g, but have problems of volume expansion during charging/discharging and performance degradation.

Meanwhile, recently, while medium and large-size lithium secondary batteries have been wide spread, high capacity and high energy density are being demanded, but existing carbon-based or non-carbon-based negative electrode materials have limits in satisfying such performance. Accordingly, recently, research for reusing lithium metal such as a lithium-air battery is being actively carried out, and interests in lithium-metal secondary batteries are being rising high again. Lithium is very light and has possibility of achieving excellent energy density so as to have theoretical capacity exceeding 3800 mAh/g.

However, to apply the lithium metal as a negative electrode material of a secondary electrode, there are a pile of problems to overcome First, unlike a graphite-based negative electrode material, in a lithium-metal negative electrode, ion-type lithium escaped from a positive electrode is changed into neutral lithium through an electrochemical reaction with electrons transferred from an external conductive wire, and therefore, during charging, a very irregular lithium aggregate is easily formed on the surface of lithium in a shape of a resin phase. The irregular surface formed as such provides a wholly expanded volume, ions are not selectively separated from the lithium resin phase during discharging, but are more likely to be directly dissociated from lithium metal. Therefore, while undergoing a series of charging/discharging, the surface of the lithium-metal negative electrode not only experiences extreme volume change but also has a resin phase which is formed thereon and exhibits an irregular and complicated morphology. Such a complicated state of the surface cannot be stabilized at all while cycles progress and continuously repeats generation and extinction, and thereby exhibits a very irregular cycle life. In addition, a lithium resin phase formed during discharging is entirely transferred to a region of electrolyte while being dissociated, or the resin phase continuously grows, penetrates a separation membrane, and directly or indirectly contacts the surface of a positive electrode positioned on the opposite side, thereby also causes a short circuit.

Thus, to commercialize a lithium-metal secondary battery, a method which can improve the charging/discharging characteristics and life characteristics is demanded.

DISCLOSURE OF THE INVENTION

Technical Problem

The present invention has been devised to solve the aforementioned limitations of conventional arts, and the purpose of the present invention is to provide a negative electrode for a lithium-metal secondary battery, which has a wide specific surface area and a current density distribution that can be uniformly implemented, and a lithium-metal secondary battery including the same.

Another purpose of the present invention is to provide a lithium-metal secondary battery having excellent charging/discharging characteristics by including the electrode.

Technical Solution

According to an aspect of the present invention, there is provided a negative electrode for a lithium-metal secondary battery, the negative electrode including a collector; and a lithium layer formed on at least one surface of the collector, wherein the collector includes a nickel foam; and a tin plated layer formed on the surface of the nickel foam, and the lithium layer has a structure having a plurality of pores.

According to another aspect of the present invention, there is provided a method for manufacturing the above negative electrode for a lithium-metal secondary battery, the method including: forming a tin plated layer on the surface of a nickel foam to manufacture a collector (step 1); and forming a lithium layer on the collector.

According to another aspect of the present invention, there is provided a lithium-metal secondary battery including the negative electrode, and a positive electrode, a separation membrane disposed between the negative electrode and the positive electrode, and an electrolyte.

Advantageous Effects

A negative electrode according to the present invention includes a lithium layer having a plurality of pores on at least one surface thereof while using a nickel foam having a tin plated layer, so that the specific surface area of the negative electrode can be increased and the current density distribution can thereby be uniformly implemented.

In addition, a lithium-metal secondary battery according to the present invention includes the negative electrode, so that the charging/discharging efficiency can be increased due to a lithium layer having a plurality of pores on at least one surface of a nickel foam collector having a tin plated layer, and the cycle characteristics thereof can thereby be improved.

Accordingly, the negative electrode and the lithium-metal secondary battery including the same according to the present invention can be usefully applied to the battery industry.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a negative electrode for a lithium-metal secondary battery, the negative electrode enabling an implementation of a uniform current density distribution and improvement of charging/discharging efficiency and life characteristics of a lithium-metal secondary battery including the negative electrode.

A negative electrode for a lithium-metal secondary battery according to an embodiment of the present invention includes a collector; and a lithium layer formed on at least one surface of the collector, wherein the collector includes a nickel foam; and a tin plated layer formed on the surface of the nickel foam, and the lithium layer has a structure having a plurality of pores.

Hereinafter with reference to FIG. 1, the negative electrode according to an embodiment of the present invention will be described in detail.

Figure 1:
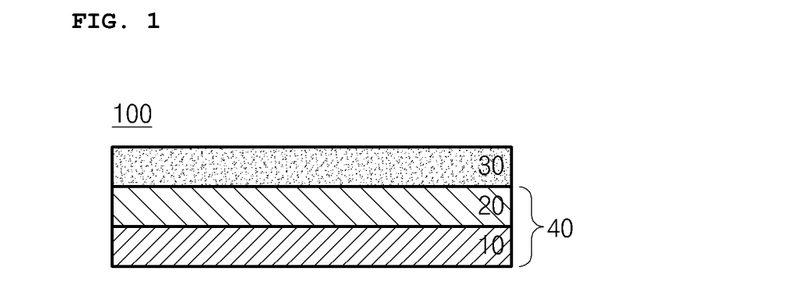
FIG. 1 schematically illustrates a structure of a negative electrode 100 according to an embodiment of the present invention.

FIG. 1 schematically illustrates a structure of a negative electrode according to an embodiment of the present invention.

As illustrated in FIG. 1, a negative electrode 100 according to an embodiment of the present invention includes a collector 40 and a lithium layer 30, wherein the collector 40 includes a nickel foam 10 and a tin plated layer 20 formed on the surface of the nickel foam, and the lithium layer 30 has a structure having a plurality of pores.

Specifically, the collector 40, as described above, includes a nickel foam 10 and a tin plated layer formed on the surface of the nickel foam, and the collector 40 may be manufactured by plating tin on the surface of the nickel foam through a manufacturing method to be described later.

The nickel foam has a thickness of 50 μm to 150 μm, a specific surface area of 15 m$^2$/g to 16 m$^2$/g, and a pore volume of 40 cm$^3$/g to 50 cm$^3$/g, wherein the pore volume may be different according to the thickness. For example, the smaller the thickness of the nickel foam, the smaller the pore volume may be, and specifically, the nickel foam may have a pore volume of 40 cm$^3$/g when the thickness is 50 μm.

In addition, the tin plated layer may have, but not particularly limited to, a thickness of 5 μm to 10 μm. When the thickness of the tin plated layer is out of the above range, the thickness of the negative electrode including the tin plated layer may be excessively thick, and consequently, there may be a limitation of decreasing energy density.

The lithium layer 30, as described above, may be formed on at least one surface of the collector 40, and be formed through a manufacturing method to be described later.

Specifically, the lithium layer 30 may have a structure having a plurality of pores, a thickness of 5 μm to 10 μm, and a loading of 2 mg per 1 cm$^2$ of unit area. That is, the lithium layer 30 may have a structure in which 2 mg of lithium is present per 1 cm$^2$ of unit area while having a plurality of pores. When the thickness and loading of the lithium layer 30 is out of the above range, the energy density of the negative electrode including the lithium layer may be decreased, and during repetitive charge/discharge, degeneration occurs early and the cycle characteristics thereof may be degraded.

In addition, the present invention provides a method for manufacturing the negative electrode for a lithium-metal secondary battery.

A method for manufacturing a negative electrode for a lithium-metal secondary battery according to an embodiment of the present invention is characterized by including the steps of: forming a tin plated layer on a surface of a nickel foam to manufacture a collector (step A); and forming a lithium layer on the collector (step B).

Step A is a step in which tin is formed on the surface of the nickel foam to manufacture the collector which is a nickel foam structure in which the tin plated layer is formed by forming tin on the surface of the nickel foam, and may be performed by dipping the nickel foam and a tin thin film into a metal-containing electrolyte and performing electrolytic plating, wherein the metal-containing electrolyte may contain nickel and tin.

The electrolytic plating may be, but not particularly limited to be, performed by applying a current of 0.25 mA to 0.5 mA. In this case, during the electrolytic plating, when the plating is performed at a high current greater than 0.5 mA, the tin plated layer may not be uniformly formed.

In addition, the electrolytic plating may be performed at room temperature, for example, a temperature condition of 25° C.

That is, the collector may be manufactured in a structure in which the tin plated layer is formed on the surface of the nickel foam in such a way that: while using the nickel foam as a working electrode and the tin thin film as a counter electrode, the working electrode and the counter electrode are positioned in the metal-containing electrolyte; a voltage is applied according to the above-described condition to allow an electrolytic reaction to occur; and nickel and tin which are metal particles in the metal-containing electrolyte are deposited or generated on the surface of the nickel foam, and thus, the tin plated layer is formed on the surface of the nickel foam.

In this case, the metal-containing electrolyte may be an aqueous solution containing a metal source that provides metal particles and an additive.

The metal source may be used without a particular limitation as long as the metal source can provide desired metal particles, but for example, the nickel source may be $NiCl_2 \cdot 6H_2O$ and the tin source may be $SnCl_2 \cdot 2H_2O$. In addition, the additive may be an additive generally used in the art without a particular limitation, for example, $K_2P_2O_7$, $NH_2CH_2COOH$, $NH_4OH$, or the like.

Step B is a step for forming the lithium layer on at least one surface of the collector, and may be performed by positioning a lithium thin film on the collector and heating the resultant.

That is, the lithium layer may be formed such that while the lithium thin film positioned on the collector is melted, lithium is melted onto the collector. In this case, the heat is not particularly limited as long as the melting of the lithium thin film may be smoothly performed, but may have, for example, a temperature of 60° C.

In addition, the present invention provides a lithium-metal secondary battery including the negative electrode.

The lithium-metal secondary battery according to an embodiment of the present invention is characterized by including the negative electrode, a positive electrode, a separation membrane disposed between the positive electrode and the negative electrode, and an electrolyte.

The positive electrode may be, but not particularly limited to, a lithium thin film or a positive electrode active material layer formed on one surface of the collector. When the positive electrode is the positive electrode active material layer formed on the one surface of the collector, the positive electrode may be manufacture by applying a positive electrode active material slurry including a positive electrode active material on the one surface of the collector and drying. At this point, the slurry may further include, in addition to the positive active material, additives such as a binder, a conductor, a filler, and a dispersant.

The positive electrode active material may be, but not limited to, for example, a manganese-based spinel active material, a lithium-metal oxide, or a mixture thereof, and the lithium-metal oxide may be a lithium-manganese-based oxide, a lithium-nickel-manganese-based oxide, a lithium-manganese-cobalt-based oxide, a lithium-nickel-manganese-cobalt-based oxide, or the like. Specifically, the positive electrode active material may be $LiCoO_2$, $LiNiO_2$, $LiMnO_2$, $LiMn_2O_4$, $Li(Ni_aCo_bMn_c)O_2$ (where, $0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ (where, $0 \leq y<1$), $Li(Ni_dCo_eMn_f)O_4$ (where, $0<d<2$, $0<e<2$, $0<f<2$, $d+e+f=2$), $LiMn_{2-z}Ni_zO_4$, or $LiMn_{2-z}Co_zO_4$ (where, $0<z<2$).

The binder is a component assisting the bond between the positive electrode active material, a conductor, and a collector, and in general, the binder may be added in an amount of 1 wt % to 30 wt % based on the total amount of the positive electrode active material. Such a binder may be, but not particularly limited to, for example, one selected from the group consisting of vinylidene fluoride-hexafluoropropylene copolymer (PVDF-co-HFP), polyvinylidene fluoride, polyacrylonitrile, polymethylmethacrylate, polyvinyl alcohol, carboxymethylcellulose (CMC), starch, hydroxy propyl cellulose, regenerated cellulose, polyvinylpyrrolidone, tetrafluoroethylene, polyethylene, polypropylene, polyacrylic acid, ethylene-propylene-diene monomer (EPDM), sulfonated EPDM, styrene-butylene rubber (SBR), fluoro rubber, or a mixture of two or more thereof.

The conductor may be, but not limited to, for example, graphite such as natural graphite or artificial graphite; carbon black such as a carbon black (super-p), acetylene black, Ketjen black, channel black, furnace black, lamp black, and thermal black; conductive fibers such as carbon fibers and metallic fibers; metal powder such as carbon fluoride powder, aluminum powder and nickel powder; conductive whiskers such as zinc oxide and potassium titanate; conductive metal oxides such as titanium oxide; conductive materials such as polyphenylene derivatives, or the like. The conductor may be generally added in an amount of 0.05 wt % to 5 wt % based on the total weight of the positive electrode active material slurry.

The filler is a component that suppresses the expansion of the positive electrode, whether to use the filler may be determined according to a need, and the filler may be, but not particularly limited to, for example, an olefin-based polymer, such as polyethylene and polypropylene, and fibrous materials such as glass fibers and carbon fibers, as long as it does not cause a chemical change to the battery and is a fibrous material.

The dispersant (dispersing liquid) may be, but not limited to, for example, isopropyl alcohol, N-methylpyrrolidone (NMP), acetone, or the like.

The applying of the positive electrode active material slurry may be performed through a generally known method in the art, but may be performed by distributing the positive electrode active material slurry on one-side upper surface of the positive electrode collector and then uniformly dispersing the positive electrode active material slurry by using a doctor blade or the like. Additionally, the applying may be performed through a method such as die casting, comma coating, or screen printing.

The drying may be, but not particularly limited to, performed in a vacuum oven of 50° C. to 200° C. within one day.

The separation membrane may be an insulating thin film having high ion permeability and mechanical strength, and generally have a pore diameter of 0.01 μm to 10 μm and a thickness of 5 μm to 300 μm. As such a separation membrane, a porous polymer film, for example, a porous polymer film manufactured by using a polyolefin-based polymer, such as an ethylene single polymer, a propylene single polymer, an ethylene-butane copolymer, an ethylene-hexene copolymer, an ethylene-methacrylate copolymer, may be sorely used or a laminate thereof may be used. In addition, a general porous nonwoven fabric, for example, a fabric of a high-melting-point glass, polyethylene terephthalate fibers, or the like may be used, but the present invention is not limited thereto.

The electrolyte may be, but not particularly limited to, an electrolyte containing a generally used organic solvent and a lithium salt.

Negative ions of the lithium salt may be one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $(CF_3SO_2)_2N^-$, $(FSO_2)_2N^-$, $CF_3CF_2(CF_3)_2CO^-$, $(CF_3CO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The organic solvent may be one or more selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfide, and tetrahydrofuran.

In particular, among the carbonate-based organic solvent, it may be desirable to use the ethylene carbonate and the propylene carbonate, which are cyclic carbonates, because the ethylene carbonate and the propylene carbonate are high viscosity organic solvents, have high dielectric constants, and thus easily dissociate a lithium salt in the electrolyte. In addition, when a linear carbonate having low viscosity and dielectric constant is used by being added to such a cyclic carbonate with an appropriate ratio, an electrolyte having a high electrical conductivity may be prepared, and thus may be more favorably used.

Further, if necessary, in order to improve charge/discharge characteristics and flame retardancy or the like, the electrolyte may further include pyridine, triethyl phosphate, triethanolamine, cyclic ether, ethylenediamine, n-glyme, hexaphosphoric triamide, a nitrobenzene derivative, sulfur, quinone-imine dye, N-substituted oxazolidinone, N,N-substituted imidazolidine, ethylene glycol dialkyl ether, an ammonium salt, pyrrole, 2-methoxyethanol, and aluminum trichloride, or the like. According to cases, in order to impart incombustibility, a halogen-containing solvent such as carbon tetrachloride or trifluoride ethylene may further be included, and in order to improve a high-temperature conservation characteristic, carbon dioxide gas may also further be included, and fluoro-ethylene carbonate (FEC), propene sultone (PRS), fluoro-propylene carbonate (FPC), or the like may further be included.

A lithium-metal secondary battery of the present invention may be manufacture such that an electrode assembly is formed by disposing a separation membrane between a positive electrode and a negative electrode, the electrode assembly is incorporated into a cylindrical battery case or a square battery case, and then, an electrolyte is injected thereinto. Alternatively, the lithium-metal secondary battery of the present invention may also be manufactured such that after the electrode assembly is laminated, the resultant obtained by impregnating the laminated electrode assembly into the electrolyte is incorporated into the battery case and sealed.

The battery case generally used in the art may be adopted, has an outer shape without a limitation according to the use of a battery, and the shape may be, for example, a cylindrical shape using a can, a square shape, a pouch shape, a coin shape, or the like.

A lithium-metal secondary battery of the present invention may not only be used for a battery cell used as a power source of a small-size device, but also favorably be used as a unit cell in a medium-and-large size battery module including a plurality of battery cells. Preferred examples of the medium-and-large size devices may be, but not limited to, electric vehicles, hybrid electric vehicles, plug-in hybrid electric vehicles, power storage systems, or the like.

Hereinafter an exemplary embodiment will be described in detail to specifically describe the present invention. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Example 1

1) Manufacturing of Collector

An electrolyte-containing beaker was dipped into a water bath filled with water, a nickel foam and a tin thin film were dipped into the electrolyte, a current of 0.5 mA is applied to perform an electrolytic plating, and thus, a collector on which a tin plated layer having a thickness of 10 μm was formed was manufactured. At this point, the nickel foam had a thickness of 50 μm and a pore volume of 40 $cm^3/g$, the temperature of water in the water bath was 50° C., and the electrolytic plating was performed for 0.15 hour. In addition, the electrolyte was prepared by adding 165.17 g of $K_2P_2O_7$, 9.38 g of $NH_2CH_2COOH$, 17.82 g of $NiCl_2.6H_2O$, and 39.48 g of $SnCl_2.2H_2O$ to 958.59 ml of distilled water, stirring the resultant to prepare a mixture solution, and then adding 26% $NH_4OH$ to the mixture solution mixture until the pH thereof reached 9.

2) Manufacturing of Negative Electrode

The collector was placed on a hot plate, a lithium thin film with a thickness of 150 μm was placed on the collector, the temperature of the hot plate was then raised up to 60° C. to melt the extruded lithium, and thus, a lithium layer having a thickness of 10 μm and a loading of 2 mg per a unit area of 1 $cm^2$ was formed to manufacture a negative electrode.

3) Manufacturing of Lithium-Metal Secondary Battery

The manufactured negative electrode was used as a working electrode, and a lithium thin film with a thickness of 150 μm was used as a positive electrode which was a counter electrode. A polyolefin separation membrane was interposed between the negative electrode and the positive electrode, and then, a coin-type half cell was manufactured by injecting an electrolyte in which 1 M of $LiPF_6$ was dissolved a solvent in which ethylene carbonate and ethylmethyl carbonate were mixed with a volume ratio of 50:50.

Example 2

1) Manufacturing of Collector

An electrolyte-containing beaker was dipped into a water bath filled with water, a nickel foam and a tin thin film were dipped into the electrolyte, a current of 0.5 mA is applied to perform an electrolytic plating, and thus, a collector on which a tin plated layer having a thickness of 10 μm was formed was manufactured. At this point, the nickel foam had a thickness of 100 μm and a pore volume of 45 cm$^3$/g, the temperature of water in the water bath was 50° C., and the electrolytic plating was performed for 0.15 hour. In addition, the electrolyte was prepared by adding 165.17 g of $K_2P_2O_7$, 9.38 g of $NH_2CH_2COOH$, 17.82 g of $NiCl_2.6H_2O$, and 39.8 g of $SnCl_2.2H_2O$ to 958.59 ml of distilled water, stirring the resultant to prepare a mixture solution, and then adding 26% $NH_4OH$ to the mixture solution until the pH thereof reached 9.

2) Manufacturing of Negative Electrode

The collector was placed on a hot plate, a lithium thin film with a thickness of 150 μm was placed on the collector, the temperature of the hot plate was then raised up to 60° C. to melt the extruded lithium, and thus, a lithium layer having a thickness of 10 μm and a loading of 2 mg per a unit area of 1 cm$^2$ was formed to manufacture a negative electrode.

3) Manufacturing of Lithium-Metal Secondary Battery

The manufactured negative electrode was used as a working electrode, and a lithium thin film with a thickness of 150 μm was used as a positive electrode which was a counter electrode. A polyolefin separation membrane was interposed between the negative electrode and the positive electrode, and then, a coin-type half cell was manufactured by injecting an electrolyte in which 1 M of $LiPF_6$ was dissolved a solvent in which ethylene carbonate and ethylmethyl carbonate were mixed with a volume ratio of 50:50.

Example 3

1) Manufacturing of Collector

An electrolyte-containing beaker was dipped into a water bath filled with water, a nickel foam and a tin thin film were dipped into the electrolyte, a current of 0.5 mA is applied to perform an electrolytic plating, and thus, a collector on which a tin plated layer having a thickness of 10 μm was formed was manufactured. At this point, the nickel foam had a thickness of 150 μm and a pore volume of 50 cm$^3$/g, the temperature of water in the water bath was 50° C., and the electrolytic plating was performed for 0.15 hour. In addition, the electrolyte was prepared by adding 165.17 g of $K_2P_2O_7$, 9.38 g of $NH_2CH_2COOH$, 17.82 g of $NiCl_2.6H_2O$, and 39.48 g of $SnCl_2.2H_2O$ to 958.59 ml of distilled water, stirring the resultant to prepare a mixture solution mixture, and then adding 26% $NH_4OH$ to the mixture solution mixture until the pH thereof reached 9.

2) Manufacturing of Negative Electrode

The collector was placed on a hot plate, a lithium thin film with a thickness of 150 μm was placed on the collector, the temperature of the hot plate was then raised up to 60° C. to melt the extruded lithium, and thus, a lithium layer having a thickness of 10 μm and a loading of 2 mg per a unit area of 1 cm$^2$ was formed to manufacture a negative electrode.

3) Manufacturing of Lithium-Metal Secondary Battery

The manufactured negative electrode was used as a working electrode, and a lithium thin film with a thickness of 150 μm was used as a positive electrode which was a counter electrode. A polyolefin separation membrane was interposed between the negative electrode and the positive electrode, and then, a coin-type half cell was manufactured by injecting an electrolyte in which 1 M of $LiPF_6$ was dissolved a solvent in which ethylene carbonate and ethylmethyl carbonate were mixed with a volume ratio of 50:50.

Example 4

1) Manufacturing of Collector

An electrolyte-containing beaker was dipped into a water bath filled with water, a nickel foam and a tin thin film were dipped into the electrolyte, a current of 0.5 mA is applied to perform electrolytic plating, and thus, a collector on which a tin plated layer having a thickness of 10 μm was formed was manufactured. At this point, the nickel foam had a thickness of 40 μm and a pore volume of 35 cm$^3$/g, the temperature of water in the water bath was 50° C., and the electrolytic plating was performed for 0.15 hour. In addition, the electrolyte was prepared by adding 165.17 g of $K_2P_2O_7$, 9.38 g of $NH_2CH_2COOH$, 17.82 g of $NiCl_2.6H_2O$, and 39.48 g of $SnCl_2.2H_2O$ to 958.59 ml of distilled water, stirring the resultant to prepare a mixture solution, and then adding 26% $NH_4OH$ to the mixture solution until the pH thereof reached 9.

2) Manufacturing of Negative Electrode

The collector was placed on a hot plate, a lithium thin film with a thickness of 150 μm was placed on the collector, the temperature of the hot plate was then raised up to 60° C. to melt the extruded lithium, and thus, a lithium layer having a thickness of 10 μm and a loading of 2 mg per a unit area of 1 cm$^2$ was formed to manufacture a negative electrode.

3) Manufacturing of Lithium-Metal Secondary Battery

The manufactured negative electrode was used as a working electrode, and a lithium thin film with a thickness of 150 μm was used as a positive electrode which was a counter electrode. A polyolefin separation membrane was interposed between the negative electrode and the positive electrode, and then, a coin-type half cell was manufactured by injecting an electrolyte in which 1 M of $LiPF_6$ was dissolved a solvent in which ethylene carbonate and ethylmethyl carbonate were mixed with a volume ratio of 50:50.

Example 5

1) Manufacturing of Collector

An electrolyte-containing beaker was dipped into a water bath filled with water, a nickel foam and a tin thin film were dipped into the electrolyte, a current of 0.5 mA is applied to perform an electrolytic plating, and thus, a collector on which a tin plated layer having a thickness of 10 μm was formed was manufactured. At this point, the nickel foam had a thickness of 200 μm and a pore volume of 60 cm$^3$/g, the temperature of water in the water bath was 50° C., and the electrolytic plating was performed for 0.15 hour. In addition, the electrolyte was prepared by adding 165.17 g of $K_2P_2O_7$, 9.38 g of $NH_2CH_2COOH$, 17.82 g of $NiCl_2.6H_2O$, and 39.48 g of $SnCl_2.2H_2O$ to 958.59 ml of distilled water, stirring the resultant to prepare a mixture solution mixture, and then adding 26% $NH_4OH$ to the mixture solution until the pH thereof reached 9.

2) Manufacturing of Negative Electrode

The collector was placed on a hot plate, a lithium thin film with a thickness of 150 μm was placed on the collector, the temperature of the hot plate was then raised up to 60° C. to melt the extruded lithium, and thus, a lithium layer having a thickness of 10 μm and a loading of 2 mg per a unit area of 1 cm$^2$ was formed to manufacture a negative electrode.

3) Manufacturing of Lithium-Metal Secondary Battery

The manufactured negative electrode was used as a working electrode, and a lithium thin film with a thickness of 150 μm was used as a positive electrode which was a counter electrode. A polyolefin separation membrane was interposed between the negative electrode and the positive electrode, and then, a coin-type half cell was manufactured by injecting an electrolyte in which 1 M of $LiPF_6$ was dissolved a solvent in which ethylene carbonate and ethylmethyl carbonate were mixed with a volume ratio of 50:50.

Comparative Example 1

A nickel foam having a thickness of 50 μm and a pore volume of 40 $cm^3$/g was used as a negative electrode which served as a working electrode, and a lithium thin film with a thickness of 150 μm was used as a positive electrode which served as a counter electrode. A polyolefin separation membrane was interposed between the negative electrode and the positive electrode, and then, a coin-type half cell was manufactured by injecting an electrolyte in which 1 M of $LiPF_6$ was dissolved a solvent in which ethylene carbonate and ethylmethyl carbonate were mixed with a volume ratio of 50:50.

Comparative Example 2

Except for using a nickel foam having a thickness of 100 μm and a pore volume of 45 $cm^3$/g as a negative electrode which served as a working electrode, a coin-type half cell was manufactured through the same method as Comparative example 1.

Comparative Example 3

Except for using a nickel foam having a thickness of 150 μm and a pore volume of 50 $cm^3$/g as a negative electrode which served as a working electrode, a coin-type half cell was manufactured through the same method as Comparative example 1.

Comparative Example 4

Except for using the collector manufactured in example 1 as a negative electrode which served as a working electrode, a coin-type half cell was manufactured through the same method as Comparative example 1.

Comparative Example 5

Except for using the collector manufactured in Example 2 as a negative electrode which served as a working electrode, a coin-type half cell was manufactured through the same method as Comparative example 1.

Comparative Example 6

Except for using the collector manufactured in Example 3 as a negative electrode which served as a working electrode, a coin-type half cell was manufactured through the same method as Comparative example 1.

Experimental Example 1

Each of the cells manufactured in Examples 1 and 3, and Comparative examples 1 to 6 was charged/discharged by using an electrochemical charger/discharger, and then charge/discharge characteristics, the delithiation capacity, and the battery efficiency (coulombic efficiency) were measured. The results are shown in Table 1, FIG. 1, and FIG. 3.

Specifically, each cell was charged for 2 hour to 2 hours with 1 mA/$cm^2$ and was discharged until a voltage reached 1 V vs. Li/Li+. That is, a value of discharging capacity and a value of charging/discharging efficiency were measured by fixing a charging capacity at a certain amount and applying a voltage cut-off to a discharge.

TABLE 1

| Division | Initial charging capacity(mAh) | 50-cycle discharging capacity(mAh) | 50-cycle charging/ discharging capacity keeping ratio(%) |
|---|---|---|---|
| Example 1 | 3.99 | 3.79 | 94.78 |
| Example 2 | 4.00 | 3.81 | 95.25 |
| Example 3 | 3.99 | 3.55 | 88.81 |
| Example 4 | 4.00 | 2.87 | 71.75 |
| Example 5 | 3.98 | 2.68 | 67.34 |
| Comparative example 1 | 3.97 | 0.22 | 5.53 |
| Comparative example 2 | 4.03 | 0.60 | 14.90 |
| Comparative example 3 | 4.02 | 0.55 | 13.69 |
| Comparative example 4 | 3.94 | 0.14 | 3.55 |
| Comparative example 5 | 4.02 | 0.74 | 18.39 |
| Comparative example 6 | 4.01 | 0.67 | 16.72 |

Figure 2:
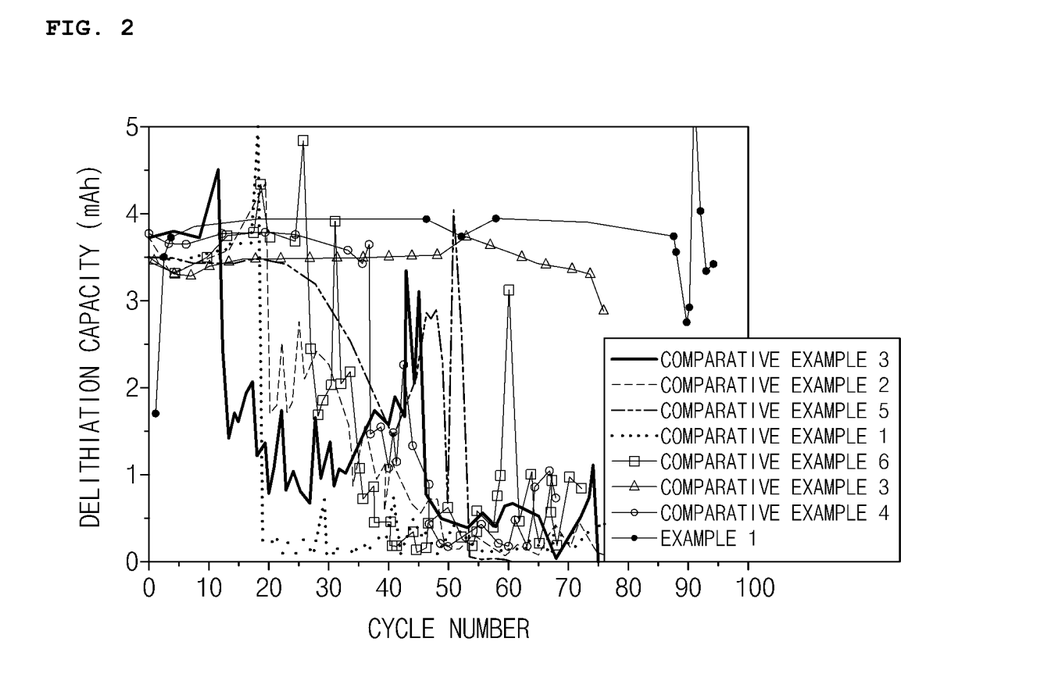
FIG. 2 is a graph of analysis results of a decreasing rate in delithiation capacity when a lithium-metal secondary battery according to an embodiment of the present invention is charged with 1 mA/cm$^2$.
Figure 3:
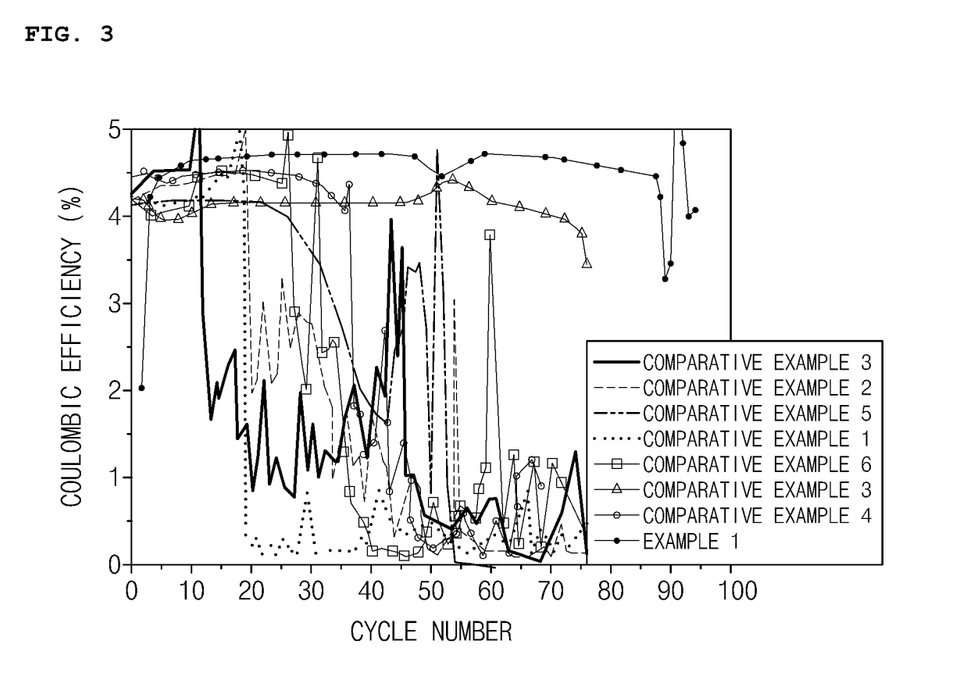
FIG. 3 is a graph of analysis results of a coulomb efficiency when a lithium-metal secondary battery according to an embodiment of the present invention is charged with 1 mA/cm$^2$.
Figure 4:
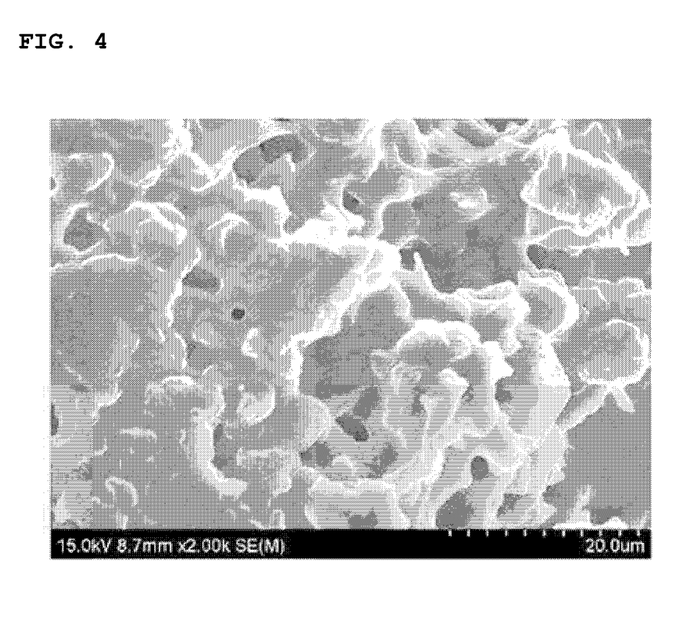
FIG. 4 is an SEM image in which a shape of a resin phase formed on the negative electrode is observed after charging/discharging a coin-type half cell of example 2 according to an embodiment of the present invention.
Figure 5:
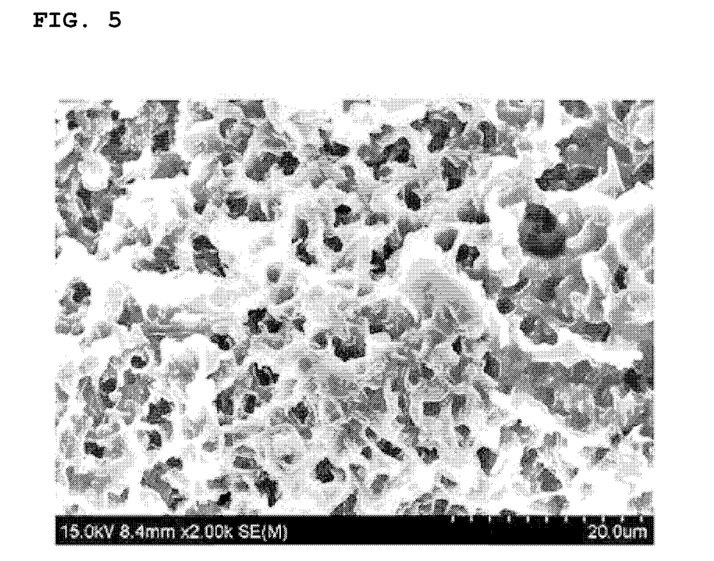
FIG. 5 is an SEM image in which a shape of a resin phase formed on the negative electrode is observed after charging/discharging a coin-type half cell of comparative example 3 according to an embodiment of the present invention.
Figure 6:
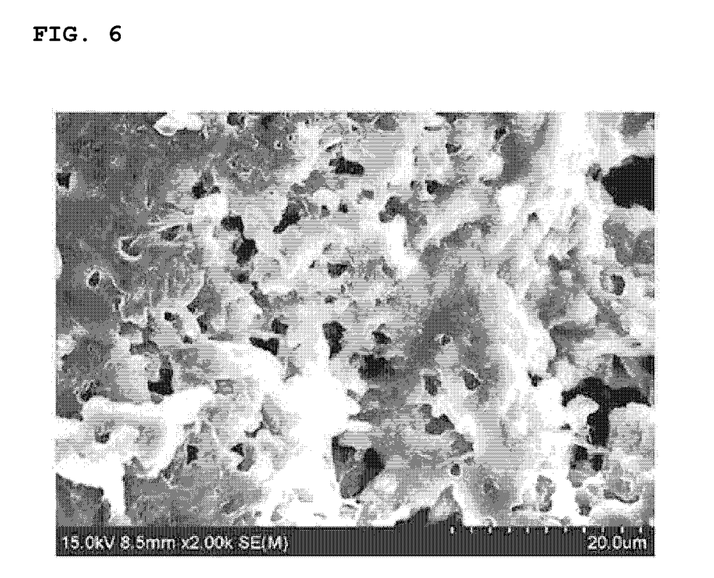
FIG. 6 is an SEM image in which a shape of a resin phase formed on the negative electrode is observed after charging/discharging a coin-type half cell of comparative example 6 according to an embodiment of the present invention.

As shown in Table 1 and FIGS. 2 and 3, it was assured that the cells of Examples 1 to 5 according to an embodiment of the present invention had a remarkably excellent keeping ratio of charging/discharging capacity, remarkably smaller decreasing rate of delithiation capacity, and higher cell efficiency than the cells of Comparative examples 1 to 6.

Meanwhile, it was assured that the cells of Examples 1 to 3 in which the nickel foam having a thickness of 50 μm to 150 μm and a pore volume of 40 $cm^3$/g to 50 $cm^3$/g was used had remarkably improved discharging capacity keeping ratio and higher cell efficiency than the cells of Examples 4 and 5 formed otherwise.

The invention claimed is:

1. A negative electrode for a lithium-metal secondary battery, the negative electrode comprising:
    a collector; and
    a lithium layer formed on at least one surface of the collector, wherein
    the collector comprises:
        a nickel foam,
            wherein the nickel foam has a thickness of 50 μm to 150 μm, and a pore volume of 40 $cm^3$/g to 50 $cm^3$/g; and
        a tin plated layer formed on the surface of the nickel foam, and
    wherein the lithium layer has a structure having a plurality of pores, and
    the lithium layer has a thickness of 5 μm to 10 μm.

2. The negative electrode of claim 1, wherein when the nickel foam has the thickness of 50 μm, the nickel foam has a pore volume of 40 $cm^3$/g.

3. The negative electrode of claim 1, wherein the tin plated layer has a thickness of 5 μm to 10 μm.

4. The negative electrode of claim 1, wherein lithium is loaded in an amount of 2 mg per a unit area of 1 $cm^2$ on the lithium layer.

5. A method of manufacturing a negative electrode for a lithium-metal secondary battery of claim 1, the method comprising the steps of:
 1) Forming the tin plated layer on a surface of the nickel foam to manufacture the collector; and
 2) forming the lithium layer on the collector.

6. The method of claim 5, wherein step 1) is performed by dipping the nickel foam and a tin thin film into a metal-containing electrolyte and performing electrolytic plating, wherein the metal-containing electrolyte contains nickel and tin.

7. The method of claim 6, wherein the electrolytic plating is performed by applying a current of 0.25 mA to 0.5 mA.

8. The method of claim 7, wherein the electrolytic plating is performed at a temperature condition of 25° C.

9. The method of claim 5, wherein step 2) is performed by positioning the lithium thin film on the collector and heating the lithium thin film.

10. A lithium-metal secondary battery comprising the negative electrode of claim 1, a positive electrode, a separation membrane disposed between the negative electrode and the positive electrode, and an electrolyte.

* * * * *